(12) United States Patent
Jenkins et al.

(10) Patent No.: US 12,330,602 B1
(45) Date of Patent: Jun. 17, 2025

(54) CAR WASH TOOL AND METHOD OF USE

(71) Applicant: Quick Quack Car Wash Holdings, LLC, Roseville, CA (US)

(72) Inventors: Christopher Michael Jenkins, Citrus Heights, CA (US); Bradly Troy Wyatt, Citrus Heights, CA (US); William Gene Ashe, Rocklin, CA (US); Scott William Hooper, Auburn, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/887,433

(22) Filed: Sep. 17, 2024

(51) Int. Cl.
*B60S 3/06* (2006.01)
*A46B 15/00* (2006.01)
*B60S 3/04* (2006.01)

(52) U.S. Cl.
CPC ............... *B60S 3/063* (2013.01); *B60S 3/06* (2013.01); *A46B 15/0036* (2013.01); *B60S 3/04* (2013.01)

(58) Field of Classification Search
CPC .......... B60S 3/04; B60S 3/06; A46B 15/0036; A46B 13/001
See application file for complete search history.

(56) References Cited

U.S. PATENT DOCUMENTS

| | | | | |
|---|---|---|---|---|
| 3,761,986 A * | 10/1973 | Rickel | ............... | B60S 3/063 15/183 |
| 4,338,698 A * | 7/1982 | Beer | ............... | A46B 13/005 15/183 |
| 4,377,878 A * | 3/1983 | Pecora | ............... | B60S 3/06 451/901 |
| 5,784,748 A * | 7/1998 | Belanger | ............... | B60S 3/063 15/230.14 |
| 5,865,374 A * | 2/1999 | Barta | ............... | B05B 3/02 285/190 |
| 6,035,482 A * | 3/2000 | Belanger | ............... | A46D 1/00 15/230.14 |
| 7,152,269 B1 * | 12/2006 | Windel | ............... | B60S 3/06 15/179 |
| 8,887,341 B2 | 11/2014 | Favagrossa | | |
| 2009/0205150 A1 * | 8/2009 | Wentworth | ............... | B60S 3/06 15/230.14 |
| 2014/0366287 A1 * | 12/2014 | Belanger | ............... | A46B 13/001 15/3 |

FOREIGN PATENT DOCUMENTS

| | | |
|---|---|---|
| CN | 102551333 A | 7/2012 |
| WO | 2000004804 A1 | 2/2000 |

* cited by examiner

*Primary Examiner* — Michael D Jennings
(74) *Attorney, Agent, or Firm* — Caldwell Intellectual Property Law

(57) ABSTRACT

A car wash tool, the car wash tool including a shaft, wherein the shaft is configured to rotate about a rotation axis; and a plurality of washing components configured to rotate along with the rotation of the shaft, wherein each of the plurality of washing components includes a first section, mechanically connected to the shaft, including a plurality of layers, wherein the plurality of washing components comprise at least a portion including different lengths of the first section; and a second section, wherein the second section includes a plurality of fingers configured to make contact with a surface of a vehicle.

16 Claims, 6 Drawing Sheets

CAR WASH TOOL AND METHOD OF USE

FIELD OF THE INVENTION

The present invention generally relates to the field of mechanical tools. In particular, the present invention is directed to car wash tools and method of use.

BACKGROUND

In the rapidly evolving automotive industry, the demand for advanced and efficient car wash systems has increased significantly, particularly in response to the diverse range of vehicle designs and customer preferences. Traditional car wash facilities often struggle to efficiently and thoroughly clean vehicles.

SUMMARY OF THE DISCLOSURE

In an aspect, a car wash tool is disclosed. The car wash tool includes a shaft, wherein the shaft is configured to rotate about a rotation axis and a plurality of washing components configured to rotate along with the rotation of the shaft, wherein each of the plurality of washing components includes a first section, mechanically connected to the shaft, comprising a plurality of layers, wherein the plurality of washing components include at least a portion comprising different lengths of the first section and a second section, wherein the second section includes a plurality of fingers configured to make contact with a surface of a vehicle.

In another aspect, a method of use of a car wash tool is disclosed. The method includes rotating a shaft about a rotation axis, wherein a first section of a plurality of washing components is mechanically connected to the shaft comprising a plurality of layers, wherein the plurality of washing components is configured to rotate along with the rotation of the shaft and the plurality of washing components include at least a portion comprising different lengths of the first section and contacting, using a plurality of fingers of a second section of the plurality of washing components, a surface of a vehicle, wherein the second section includes different lengths of the plurality of fingers.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to car wash tools and method of use. The car wash tool includes a shaft, wherein the shaft is configured to rotate about a rotation axis and a plurality of washing components configured to rotate along with the rotation of the shaft, wherein each of the plurality of washing components includes a first section, mechanically connected to the shaft, comprising a plurality of layers, wherein the plurality of washing components include at least a portion comprising different lengths of the first section and a second section, wherein the second section includes a plurality of fingers configured to make contact with a surface of a vehicle. Exemplary embodiments illustrating aspects of the present disclosure are described below in the context of several specific examples.

Figure 1:
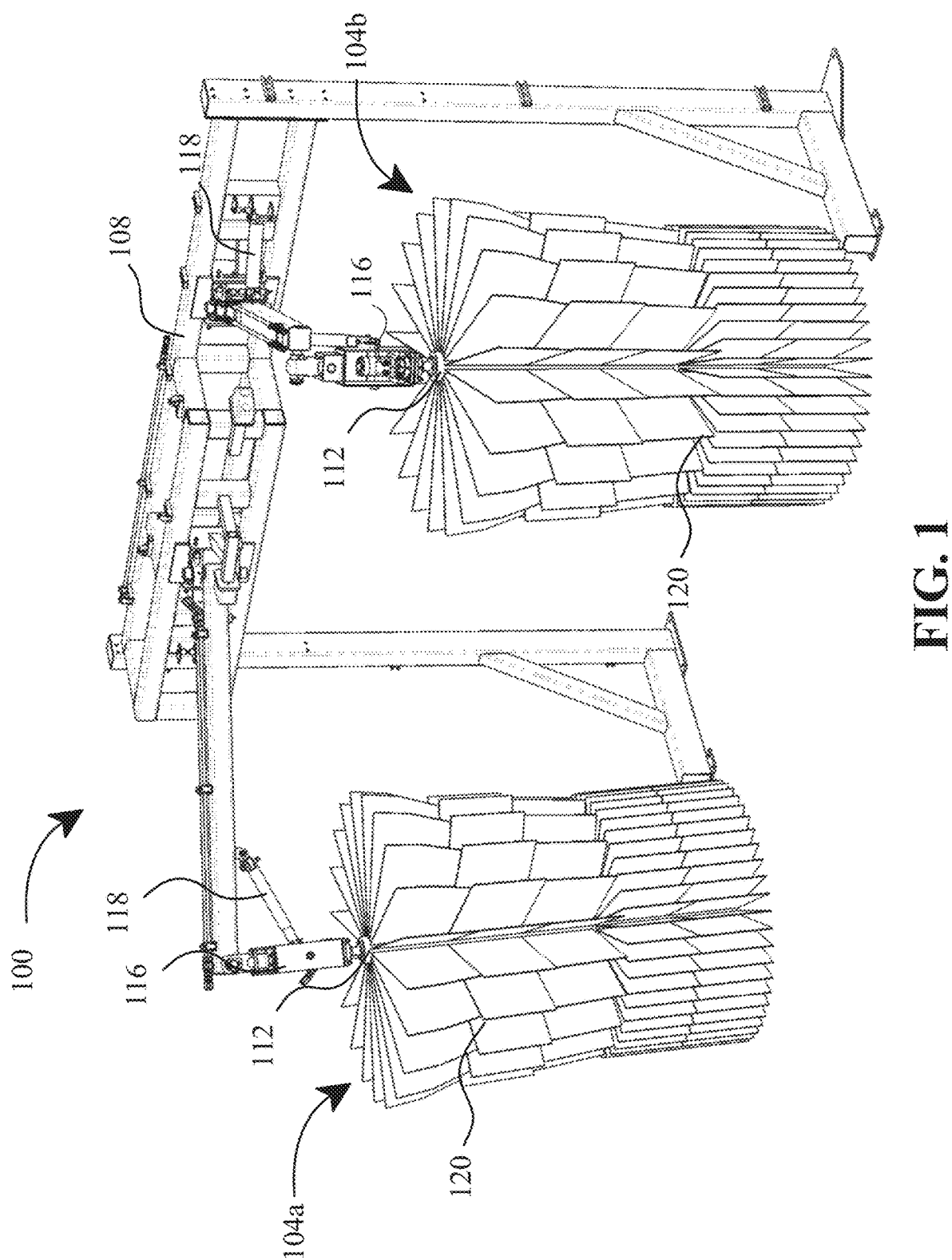
FIG. 1 illustrates an exemplary configuration of a car wash assembly.

Referring now to FIG. 1, an exemplary configuration of a car wash assembly 100 with car wash tools 104*a-b* is illustrated. For the purposes of this disclosure, a "car wash assembly" is an automated system designed to clean the exterior of vehicles. Car wash assembly 100 may include at least a car wash tool 104*a-b*. For the purposes of this disclosure, a "car wash tool" is an implement or device designed to assist in the cleaning of vehicles. In some embodiments, car wash tool 104 may be used in car wash facilities. As a non-limiting example, car wash facilities may include automatic car washes, self-service car washes, or the like. In an embodiment, car wash assembly 100 may include one car wash tool 104*a-b*. In another embodiment, car wash assembly 100 may include two or more car wash tools 104*a-b*. For example, and without limitation, car wash assembly 100 may include a first car wash tool 104*a* on the left side of a supporting frame 108 and a second car wash tool 104*b* on the right side of supporting frame 108. For example, and without limitation, car wash assembly 100 may include a first car wash tool 104*a* on the left side of supporting frame 108, second car wash tool 104*b* on the right side of supporting frame 108, third car wash tool on the top of supporting frame 108 and fourth car wash tool on the bottom of supporting frame 108, or the like. For example, and without limitation, car wash assembly 100 may include one car wash tool 104*a* that moves around a supporting frame 108 and covers all sides.

With continued reference to FIG. 1, for the purposes of this disclosure, a "supporting frame" is a structural framework that provides stability and support for the various components and mechanisms of the system. As a non-limiting example, supporting frame 108 may include steel, stainless steel, steel alloys, aluminum, metal, plastic, or a reinforced composite. In some embodiments, car wash tool 104*a-b* may be mechanically connected to supporting frame 108. As used herein, a person of ordinary skill in the art would understand "mechanically coupled" to mean that at least a portion of a device, component, or circuit is connected to at least a portion of another device, component, or circuit via a mechanical coupling. In some instances, the terminology "mechanically connected" may be used in place of mechanically coupled in this disclosure. In some embodiments, car wash tool 104a-b may be mechanically connected to supporting frame 108 using shaft 112 as described below.

With continued reference to FIG. 1, in some embodiments, car wash tool 104a-b may be mechanically connected to supporting frame 108 using at least an actuator 116. For the purposes of this disclosure, an "actuator" is a component of a machine that is responsible for moving and/or controlling a mechanism or system. In some embodiments, actuator 116 may require a control signal and/or a source of energy or power. In some embodiments, actuator 116 may include pulleys. In some embodiments, actuator 116 may include at least a frame actuator 118. In some embodiments, frame actuator 118 may be consistent with actuator 116. For the purposes of this disclosure, a "frame actuator" is an actuator that is responsible for moving and/or controlling a mechanism or system between a supporting frame and a car wash tool 104a-b. In some embodiments, frame actuator 118 may be configured to adjust an angle between car wash tool 104a-b and supporting frame 108. As a non-limiting example, frame actuator 118 may be lengthened to widen the angle between car wash tool 104a-b and supporting frame 108. As a non-limiting example, frame actuator 118 may be shortened to narrow the angle between car wash tool 104a-b and supporting frame 108. Adjusting the frame actuator 118 may allow car wash tools 104a-b to wash all sides of a vehicle from the side to the top surface. In some embodiments, computing device may be configured to generate a command for frame actuator 118 to move to control movement of car wash tools 104a-b. The computing device disclosed herein is further described with respect to FIG. 6.

With continued reference to FIG. 1, in some embodiments, actuator 116 may include a hydraulic actuator. The hydraulic actuator may consist of a cylinder or fluid motor that uses hydraulic power to facilitate mechanical operation. Outputs of the hydraulic actuator may include mechanical motion, such as without limitation linear, rotatory, or oscillatory motion. In some cases, the hydraulic actuator may employ a liquid hydraulic fluid. As liquids, in some cases. are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting may be used when pressure is applied substantially on each side of a piston; any difference in resultant force between the two sides of the piston causes the piston to move.

With continued reference to FIG. 1, in some embodiments, actuator 116 may include a pneumatic actuator. In some cases, the pneumatic actuator may enable considerable forces to be produced from relatively small changes in gas pressure. In some cases, the pneumatic actuator may respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 1, actuator 116 may be an electric actuator. In some embodiments, the electric actuator may include any electromechanical actuators, linear motors, and the like. In some cases, actuator 116 may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors. The linear motors may be directly controlled by a control signal for controlling one or more linear motor parameters. Exemplary linear motor parameters include without limitation position, force, velocity, potential, and current.

With continued reference to FIG. 1, in some embodiments, actuator 116 may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as a power source for the mechanical actuator. Mechanical actuators may employ any number of mechanisms, including for example without limitation gears, rails, pulleys, cables, linkages, and the like.

With continued reference to FIG. 1, car wash tool 104a-b includes a shaft 112. As used in this disclosure, a "shaft" is a long structural component of a car wash tool that transmits motion to washing components. The washing components 120 described herein is further described below. In some embodiments, shaft 112 may include a long, cylindrical configuration. In some embodiments, shaft 112 may include a durable material. As a non-limiting example, shaft 112 may include steel, stainless steel, steel alloys, aluminum, metal, plastic, or a reinforced composite. In some embodiments, shaft 112 may include water resistant materials or coatings, corrosion resistant materials or coatings, or the like. As a non-limiting example, shaft 112 may include polyester, polypropylene, polyethylene, stainless steel, aluminum, or the like. In some embodiments, shaft 112 may provide a central axis around which the other components of car wash tool 104a-b, such as a plurality of washing components 120, may be organized and supported. In some embodiments, car wash tool 104a-b may be mechanically connected to supporting frame 108 using a shaft 112 as described below.

Figure 2:
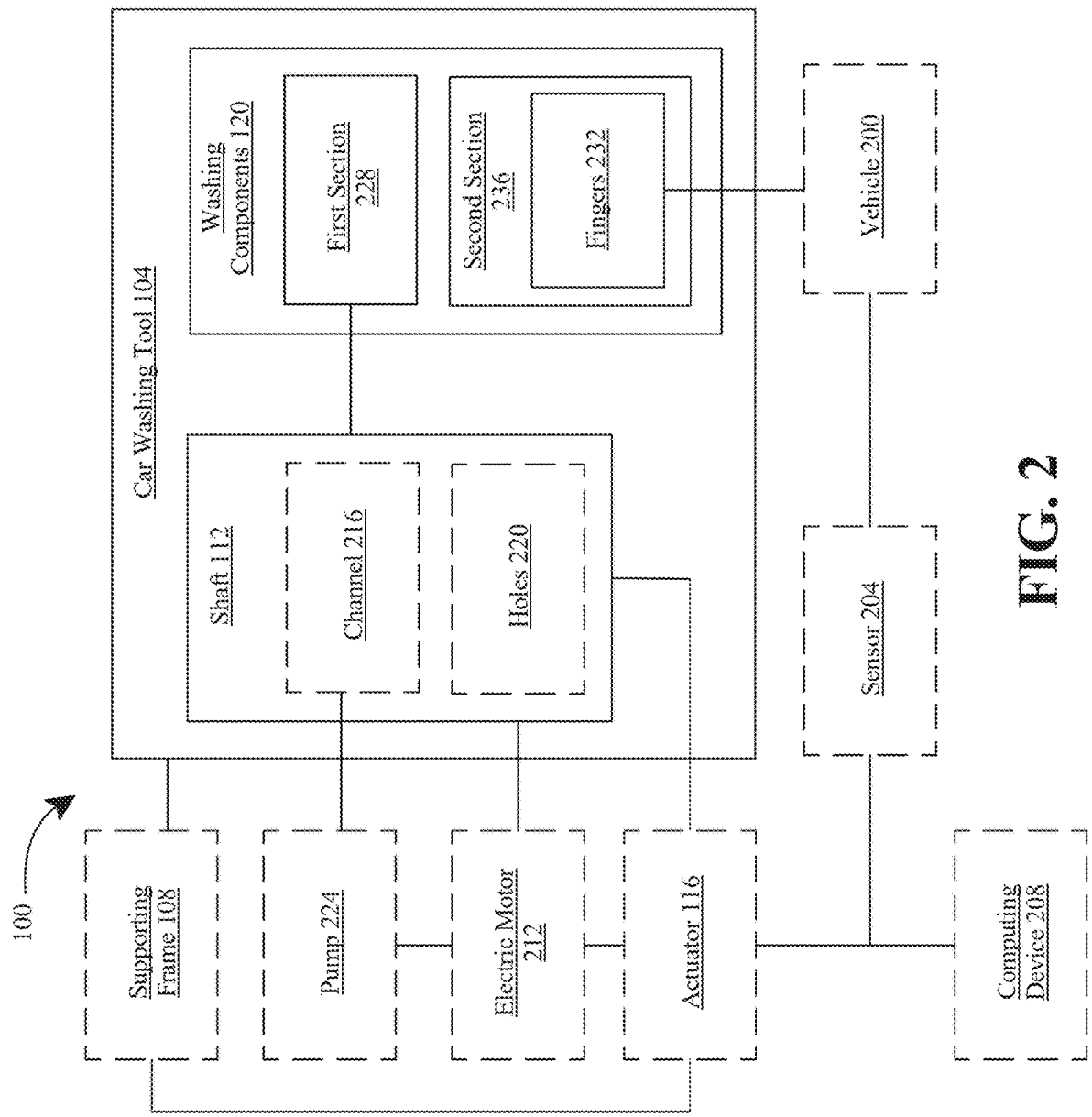
FIG. 2 illustrates a block diagram of an exemplary car wash assembly.

With continued reference to FIG. 1, in some embodiments, shaft 112 may include a length that is longer or equivalent to a height of a vehicle. As a non-limiting example, the length of shaft 112 may be between 30 and 75 inches. For example, and without limitation, the length of shaft 112 may be between 40 and 70 inches. As another non-limiting example, the length of shaft 112 may be shorter than 30 inches. As another non-limiting example, the length of shaft 112 may be longer than 75 inches. In a non-limiting example, the length of shaft 112 may be 70 inches as shown in FIG. 2 as a non-limiting example embodiment. In another non-limiting example, the length of shaft 112 may be shorter or longer than 70 inches. In some embodiments, shaft 112 may include a top portion and a bottom portion. The top portion and the bottom portion of shaft 112 are illustrated in FIG. 2. In some embodiments, top and bottom portions of shaft 112 may have equivalent lengths. In some embodiments, top and bottom portions of shaft 112 may have different lengths. In an embodiment, top portion of shaft 112 may be longer than bottom portions of shaft 112. As a non-limiting example, if shaft 112 is 70 inches long, then top portion may be 42 inches and bottom portion may be 28 inches. In another embodiment, bottom portion of shaft 112 may be longer than top portion of shaft 112. The non-limiting examples disclosed above is merely an example, and persons skilled in the art, upon reviewing the entirety of this disclosure, may appreciate various length of shaft 112 or top and bottom portions of shaft 112 that can be used for car wash tool 104.

With continued reference to FIG. 1, in some embodiments, a length of shaft 112 may be adjustable. In some embodiments, the length of shaft 112 may be adjusted as a function of a height of a vehicle. In some embodiments, the length of shaft 112 may be adjusted as a function of a height of a vehicle detected using at least a sensor as described in detail below. As a non-limiting example, the length of shaft 112 may be adjusted using an actuator 116 as described below.

With continued reference to FIG. 1, in some embodiments, shaft 112 may serve as the backbone of car wash tool 104a-b, enabling the transmission of motion, supporting rotational functions, and bearing the load of car wash tool 104a-b during operation. In some embodiments, material and dimensions of shaft 112 may be selected based on the specific requirements of car wash tool 104a-b, such as its size, weight, and the operational stresses. For example, in an automated car wash system, shaft 112 may be a stainless-steel rod designed to withstand the wet environment and resist corrosion. Its robust construction would support the rotation of washing components 120, ensuring efficient and even cleaning of vehicles as they pass through the wash system. In another example, shaft 112 may include an aluminum rod, which may be chosen for its lightweight yet strong properties. In some cases, shaft 112 may support large, heavy washing components 120 necessary for tough cleaning tasks on industrial machinery or floors.

With continued reference to FIG. 1, car wash tool 104a-b includes a plurality of washing components 120. For the purposes of this disclosure, a "washing component" is a component of a car wash tool that facilitates cleaning of a vehicle. In a non-limiting example, washing component 120 may agitate and loosen dirt, mud, and other contaminants on vehicle. In another non-limiting example, washing component 120 may incorporate with water or detergent applicators or fluids from holes to facilitate the car wash process. Shaft 112 includes a plurality of layers of washing components 120. In some embodiments, each layer of washing components 120 may include a plurality of pieces of washing components 120 surrounding the surface of shaft 112 through the circumference of shaft 112. In some embodiments, shaft 112 may include first sections of a plurality of pieces of washing components 120 mechanically attached to shaft 112 surrounding the surface of shaft 112 through the circumference of shaft 112. In some embodiments, shaft 112 may include different numbers of pieces of washing components 120. As a non-limiting example, shaft 112 may include 28 pieces in each layer of each of plurality of washing components 120 at first portion and 48 pieces of each washing components 120 at second portion mechanically attached to shaft 112, surrounding the surface of shaft 112.

With continued reference to FIG. 1, in some embodiments, plurality of washing components 120 may include various materials. As a non-limiting example, washing component 120 may include nylon, polyester, cotton, foam, microfiber, neoprene, cloth, or the like. In some embodiments, washing components 120 may include at least two materials. As a non-limiting example, each of washing components 120 may include cloths and foams. As a non-limiting example, washing components 120 may include microfiber, closed-cell (CCT) foam, ethylene-vinyl acetate (EVA) foam, or the like. In a non-limiting example, shaft 112 may include at least two different materials for washing components 120, arranged in an alternating pattern of pieces. For example, and without limitation, shaft 112 may include a first piece in microfiber cloth, a second piece in EVA foam, a third piece in cloth, and so forth, of washing components 120. In another non-limiting example, shaft 112 may include at least two different materials of washing components 120, arranged in an alternating pattern of a group of pieces. For example, and without limitation, shaft 112 may include ten pieces in microfiber clothes, another ten pieces in EVA foams, another ten pieces in microfiber clothes again, and so forth, of washing components 120. In another embodiment, washing components 120 may include one material. As a non-limiting example, each of washing components 120 may include only clothes. In a non-limiting example, car wash tool 104a-b may include a first portion of washing components 120 that includes two materials and a second portion of washing components 120 that includes one material.

With continued reference to FIG. 1, in some embodiments, washing components 120 may include at least two colors. For example, and without limitation, washing components 120 may include at least two contrasting colors. As a non-limiting example, one washing component 120 may include green and another washing component 120 may include black. In a non-limiting example, car wash tool 104a-b may include washing components 120 of different colors in alternating patterns. For example, and without limitation, car wash tool 104a-b may include two black washing components 120 on top of two green washing components 120 in repeating pattern. The non-limiting examples of configuration of washing components 120 are merely examples, and persons skilled in the art upon reviewing the entirety of this disclosure may appreciate various configurations of washing components 120 that can be used for car wash tool 104a-b.

With continued reference to FIG. 1, in some embodiments, car wash tool 104a-b may include a plurality of layers of washing components 120. In a non-limiting example, car wash tool 104a-b may include ten layers of plurality of washing components 120. In another non-limiting example, car wash tool 104a-b may include more or less than ten layers of plurality of washing components 120. In some embodiments, plurality of washing components 120 may include uniformed width. In a non-limiting example, plurality of washing components 120 may include a width between 2 inches and 12 inches. For example, and without limitation, plurality of washing components 120 may include a width between 5 and 10 inches. In another non-limiting example, plurality of washing components 120 may include a width smaller than 2 inches. In another non-limiting example, plurality of washing components 120 may include a width larger than 12 inches. As a non-limiting example, if shaft 112 has 70 inches of length and ten washing components 120 are mechanically connected to shaft 112, each plurality of washing components 120 may have 7 inches of width. In some embodiments, plurality of washing components 120 may include various width. As a non-limiting example, if shaft 112 has 70 inches of width and ten washing components 120 are mechanically connected to shaft 112, each washing components 120 may have various width from 1 inch to 30 inches, or the like. In some embodiments, plurality of washing components 120 may include uniformed lengths or various lengths as described below. As a non-limiting example, washing components 120 may have 20 inches, 27 inches, or any lengths in between. As another non-limiting example, washing components 120 may have less than 20 inches or bigger than 27 inches of lengths. In a non-limiting example, washing component 120 may include uniformed length of first section and various lengths of second sections. In another non-limiting example, washing component 120 may include various lengths of first sections and second sections. The non-limiting examples of width and length of washing components 120 are merely examples, and persons skilled in the art upon reviewing the entirety of this disclosure may appreciate various width and length of washing components 120 that can be used for car wash tool 104*a-b*. The first section and second section of washing components 120 disclosed herein are further described with respect to FIG. 2 and illustrated in FIG. 3.

Figure 3:
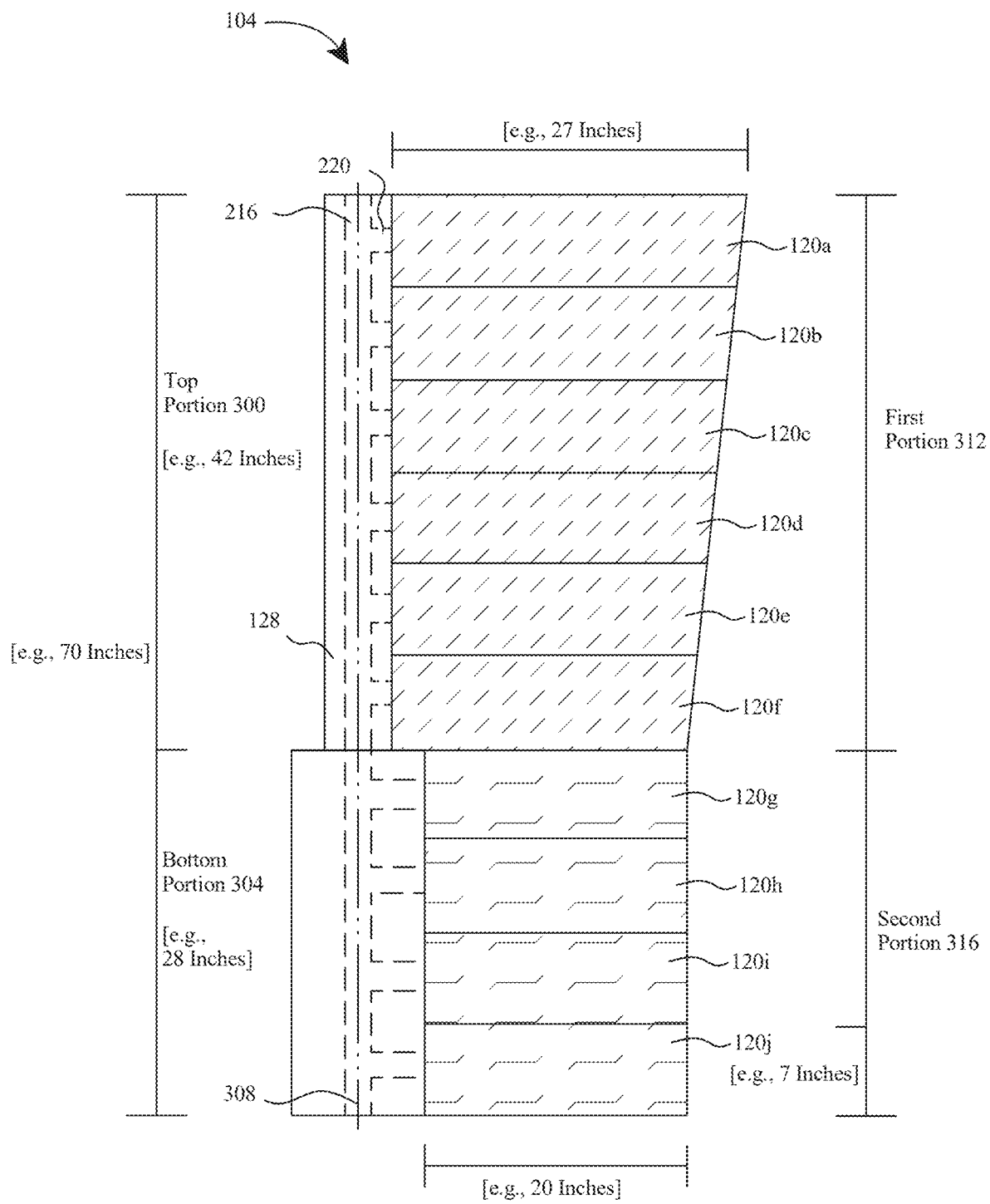
FIG. 3 illustrates a cross section of a portion of an exemplary car wash tool.

With continued reference to FIG. 1, washing component 120 is mechanically connected to shaft 112 in a plurality of layers. A washing component 120 mechanically connected to shaft 112 including a plurality of layers is illustrated in FIG. 3. As washing component 120 is mechanically connected to shaft 112, washing component 120 is configured to rotate along with the rotation of shaft 112. As a non-limiting example, when shaft 112 rotates about a rotation axis clockwise, washing component 120 also rotates along with shaft 112 about the rotation axis in a clockwise direction. As used herein, a person of ordinary skill in the art would understand "mechanically coupled" to mean that at least a portion of a device, component, or circuit is connected to at least a portion of a shaft using a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. In some instances, the terminology "mechanically connected" may be used in place of mechanically coupled in this disclosure.

With continued reference to FIG. 1, in some embodiments, washing component 120 may be coupled to shaft 112 using adhesive bonding. In some embodiments, mechanical coupling may include removeable connections. For the purposes of this disclosure, "removably connected" refers to an ability for an object that is connected to another object to be disconnected from the other object without damaging or breaking said objects. In some embodiments, removable connection may include threaded connection. For the purposes of this disclosure, "threaded connection" is a type of connection that involves mating male and female halves together to create a connection to hold the threads together. As a non-limiting example, the threaded connection may be done by way of gendered mating components. In some cases, threaded connection may be removable, but requires a specialized tool or key for removal. In another embodiment, removable connection may include snap-fit connections. In some embodiments, the snap-fit connections may include a series of tabs or hooks that snap into place when the two components are pushed together. As a non-limiting example, the snap-fit connections may include snap-fit clips, snap-fit tabs, snap-fit hinges, snap-fit latches, snap-fit hooks, snap-fit pins, and the like. In some embodiments, removable connection may include mechanical fasteners. For example, and without limitation, mechanical fasteners may include bolts, screws, nuts, washers, rivets, pins, and the like. In some embodiments, removable connection may be consistent with removable insertion. For the purposes of this disclosure, "removably inserted" refers to an object that has been inserted or placed into another object such that the object can be removed from the other object without causing damage or leaving any residue behind.

Referring now to FIG. 2, a block diagram of an exemplary car wash assembly 100 is illustrated. Car wash tool 104 may be consistent with car wash tool 104*a-b* illustrated in FIG. 1. In some embodiments, car wash tool 104 may be mechanically connected to supporting frame 108. In some embodiments, car wash tool 104 may be used in car wash facilities. In an embodiment, car wash assembly 100 may include one car wash tool 104*a-b*. In another embodiment, car wash assembly 100 may include two or more car wash tools 104*a-b*. As a non-limiting example, first car wash tool 104 may be mechanically connected to the left side of supporting frame 108 and a second car wash tool 104 may be mechanically connected to the right side of supporting frame 108. As a non-limiting example, supporting frame 108 may include steel, stainless steel, steel alloys, aluminum, metal, plastic, or a reinforced composite. In some embodiments, supporting frame 108 may be mechanically connected to car wash tool 104 using at least an actuator 116. In some embodiments, actuator 116 may be configured to adjust an angle between car wash tool 104*a-b* and supporting frame 108.

With continued reference to FIG. 2, car wash tool 104 includes a shaft 112. In some embodiments, a length of shaft 112 may be adjustable. In some embodiments, the length of shaft 112 may be adjusted as a function of a height of a vehicle 200. In some embodiments, the length of shaft 112 may be adjusted as a function of a height of a vehicle 200 detected using at least a sensor 204 as described in detail below. As a non-limiting example, the length of shaft 112 may be adjusted using an actuator 116 as described below. For the purposes of this disclosure, a "sensor" is a device that produces an output signal for the purpose of sensing a physical phenomenon. As a non-limiting example, sensor 204 may include infrared sensor, optical sensor, ultrasonic sensor, or the like. In some embodiments, and without limitation, sensor 204 may include a plurality of sensors. In a non-limiting example, sensor 204 may detect a height of a vehicle 200 and the length of shaft 112 may be adjusted to cover the height of the vehicle 200. In some embodiments, sensor 204 may include a computing device 208 described with respect to FIG. 6. In some embodiments, sensor 204 may output the sensed signal. In some embodiments, sensor 204 may be configured to convert and/or translate a plurality of signals detected into electrical signals for further analysis and/or manipulation.

With continued reference to FIG. 2, in some embodiments, a length of shaft 112 may be adjusted using at least an actuator 116. In a non-limiting example, the length of shaft 112 may be adjusted using telescoping, the movement of one part (e.g., sliding out top portion of shaft 112) from another (e.g., bottom portion of shaft 112), lengthening an object (e.g., shaft). Telescoping of shaft 112 may be actuated using actuator 116; for example, and without limitation, pulleys, hydraulic actuator, or the like. In some embodiments, actuator 116 may be communicatively connected to sensor 204 and actuator 116 may be actuated as a function of an output of sensor 204. In some embodiments, the output of sensor 204 may be transmitted to computing device 208 and computing device 208 may generate and transmit a signal as a function of the output of sensor to control actuator 116 or electric motor 212.

With continued reference to FIG. 2, in some embodiments, a length of shaft 112 may be adjusted using slots. In some embodiments, slots may be utilized to adjust the positioning of certain components along the shaft. For instance, and without limitation, car wash tool 104 and/or shaft 112 may need to adapt to cleaning surfaces of varying heights, and the slots may allow for top portion or bottom portion of shaft 112 to be moved up or down the other portion of the shaft 112 and then locked into place. Adjustability provided by slots may be useful in customizing the cleaning action for different types of surfaces or objects, ensuring car wash tool 104 can be efficiently used in a range of environments, from flat industrial to uneven surfaces. Slots may be strategically placed along the length of shaft 112 and may be designed to serve specific functions, such as, but not limited to allowing for adjustable connections, facilitating the alignment of components, accommodating elongated fasteners, or providing space for components to expand or move during operation.

With continued reference to FIG. 2, shaft 112 is configured to rotate about a rotation axis. The rotation axis of shaft 112 is illustrated in FIG. 3. In some embodiments, shaft 112 may be powered by an electric motor 212 to rotate about a rotational axis. For the purposes of this disclosure, an "electric motor" is a device that converts electrical energy into mechanical energy. In some embodiments, electric motor 212 may be driven by direct current (DC) electric power; for instance, a motor may include a brushed DC motor or the like. In some embodiments, electric motor 212 may be driven by electric power having varying or reversing voltage levels, such as alternating current (AC) power as produced by an alternating current generator and/or inverter, or otherwise varying power, such as produced by a switching power source. In some embodiments, electric motor 212 may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

With continued reference to FIG. 2, in some embodiments, shaft 112 may include at least a channel 216. For the purposes of this disclosure, a "channel" is a component that is substantially impermeable to fluids and contains and/or directs a flow of the fluids. In some embodiments, channel 216 may be positioned within shaft 112. In some embodiments, channel 216 may be configured to contain or deliver at least a fluid. For the purposes of this disclosure, a "fluid" is a gaseous or liquid material that can flow. As a non-limiting example, fluid may include air, water, detergent, wax, protectant, coatings, or the like. In some embodiments, shaft 112 may include one channel 216. In some embodiments, shaft 112 may include a plurality of channels 216. As a non-limiting example, first channel may contain or deliver air while second channel may contain or deliver water.

With continued reference to FIG. 2, in some embodiments, fluid contained or delivered through channel 216 may be let out of shaft 112 through a plurality of holes 220. In a non-limiting example, fluid may be delivered directly to vehicle 200 through holes 220. For example, and without limitation, fluid may be expelled through holes 220 using a pump 224 to pressurize the fluid and force it through holes 220, air-powered system utilizing compressed air to push the fluid through holes 220, or the like. For the purposes of this disclosure, a "pump" is any element of a mechanical component that converts mechanical power into fluidic energy. Pump 224 may include a substantially constant pressure pump (e.g., centrifugal pump) or a substantially constant flow pump (e.g., positive displacement pump, gear pump, and the like). Pump 224 can be hydrostatic or hydrodynamic. A pump 224 may generate flow with enough power to overcome pressure induced by a load at a pump outlet. A pump 224 may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps 224 include gear pumps, rotary vane pumps, screw pumps, bent axis pumps, inline axial piston pumps, radial piston pumps, and the like. Pump 224 may be powered by any rotational mechanical work source, for example without limitation and electric motor 212 or a power take off from an engine. Pump 224 may be in fluidic communication with at least a reservoir. In some cases, reservoir may be unpressurized and/or vented. Alternatively, reservoir may be pressurized and/or sealed. In a non-limiting example, reservoir may be configured to contain a fluid.

With continued reference to FIG. 2, in another non-limiting example, fluid may be delivered to a plurality of washing component 120 through holes 220, allowing the plurality of washing components 120 to get soaked with the fluid. For example, and without limitation, washing component 120 may get soaked with fluid using a capillary action. As used in this disclosure, a "hole" is an opening or perforation defined in a shaft. In some embodiments, holes 220 may be characterized by a symmetrical round shape, oval shape, slot, or any shapes thereof. In some embodiments, holes 220 can vary in size and are uniformly distributed along the shaft. In some embodiments, holes 220 may reduce the overall weight of shaft 112, facilitate the attachment of other components, or allow for the passage of elements like bolts or pins. For example, and without limitation, holes 220 may also be used in the alignment and securing of washing components 120. By inserting fastening elements like bolts or pins through these holes 220, different cleaning components can be securely fixed to shaft 112.

Arrangement may allow for quick and easy modification or replacement of parts, enhancing the versatility of car wash tool 104.

With continued reference to FIG. 2, car wash tool 104 includes a plurality of washing components 120. In a non-limiting example, washing component 120 may agitate and loosen dirt, mud, and other contaminants on vehicle 200. In another non-limiting example, washing component 120 may incorporate with water or detergent applicators or fluids from holes 220 to facilitate the car wash process. Shaft 112 includes a plurality of layers of washing components 120. In some embodiments, each layer of washing components 120 may include a plurality of pieces of washing components 120 surrounding the surface of shaft 112 through the circumference of shaft 112. In some embodiments, shaft 112 may include first sections of a plurality of pieces of washing components 120 mechanically attached to shaft 112 surrounding the surface of shaft 112 through the circumference of shaft 112. In some embodiments, shaft 112 may include different numbers of pieces of washing components 120. As a non-limiting example, shaft 112 may include 28 pieces in each layer of each of plurality of washing components 120 at first portion and 48 pieces of each washing components 120 at second portion mechanically attached to shaft 112, surrounding the surface of shaft 112. Washing component 120 includes a first section 228 mechanically connected to shaft 112. The first section 228 of washing component 120 is illustrated in FIG. 3. For the purposes of this disclosure, a "first section" of a washing component is a portion of the washing component that is mechanically connected to a shaft. In some embodiments, first section 228 may include uniformed length. As a non-limiting example, if one washing component 120 has 20 inches of length, then first section 228 may have 8 inches of length. In some embodiments, first section 228 may include various lengths. As another non-limiting example, the length of first section 228 of plurality of washing component 120 may vary from 8 inches to 14 inches, or the like. As another non-limiting example, the length of first section 228 of plurality of washing component 120 may be shorter than 8 inches. As another non-limiting example, the length of first section 228 of plurality of washing component 120 may be longer than 14 inches. In some embodiments, the length of first section 228 may increase from the bottom layer to top layer as described below. As a non-limiting example, washing component 120 connected to top portion of shaft 112 may have longer first section 228 than washing component 120 connected to bottom portion of shaft 112. The top and bottom portion of shaft 112 are illustrated in FIG. 3. The non-limiting examples of length of first section 228 are merely examples, and persons skilled in the art upon reviewing the entirety of this disclosure may appreciate various length and width of fingers 232 that can be used for car wash tool 104.

Figure 4:
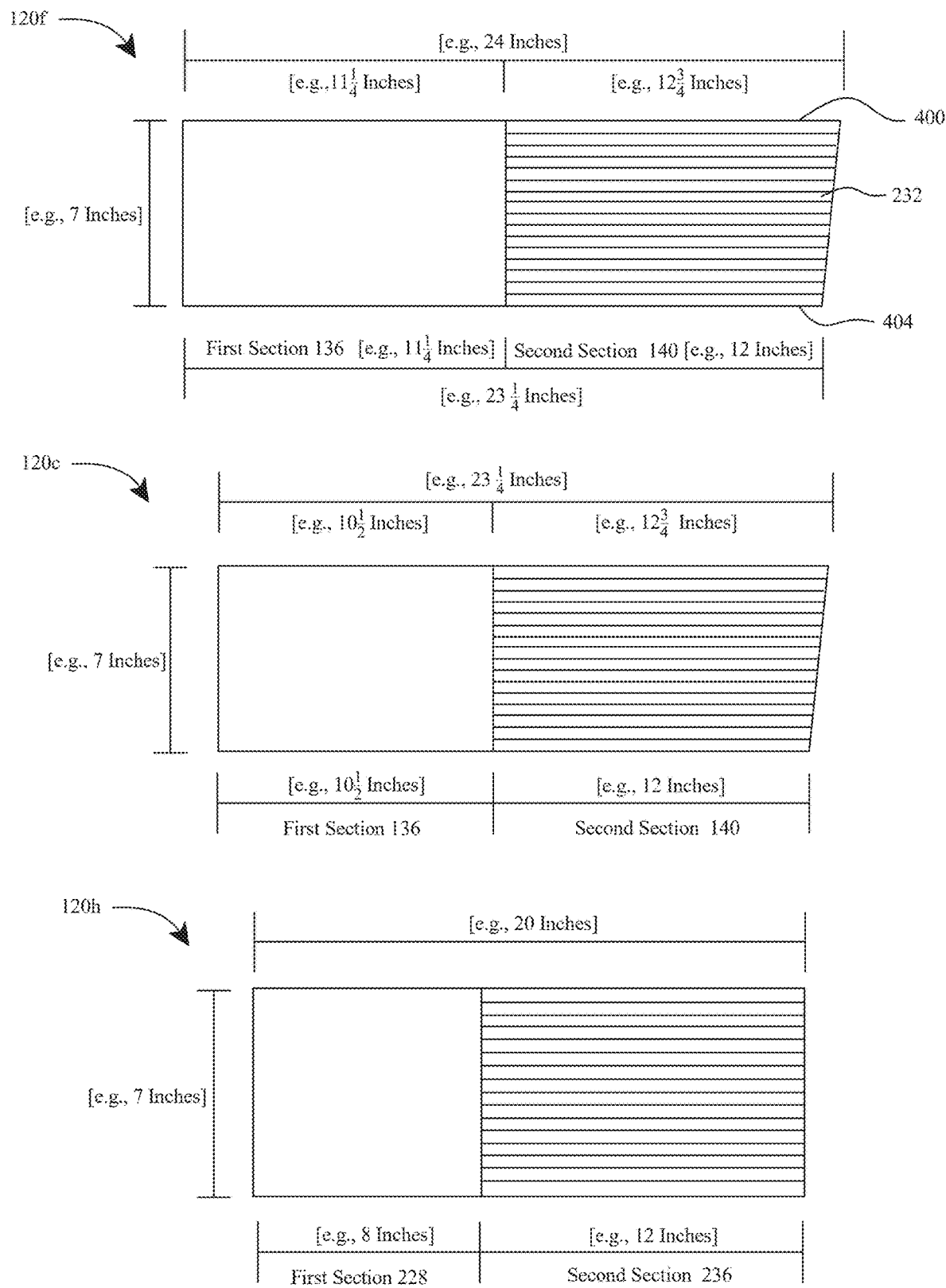
FIG. 4 illustrates configurations of exemplary washing components.

With continued reference to FIG. 2, washing component 120 includes a second section 236 that includes a plurality of fingers 232. For the purposes of this disclosure, a "second section" of a washing component is a portion of the washing component that is configured to make a contact with a vehicle. For the purposes of this disclosure, a "finger" of washing component is an elongated projection from a first section 228 of a washing component. Plurality of fingers 232 is configured to make a contact with a surface of a vehicle 200. As a non-limiting example, fingers 232 may make contact with a side profile or top surface of vehicle 200. In some embodiment, fingers 232 may agitate and loosen dirt, mud, and other contaminants on vehicle 200. Second section 236 of plurality of washing components 120 includes at least a portion including different lengths of plurality of fingers 232. In a non-limiting example, second section 236 of plurality of washing components may include different lengths of plurality of fingers 232 in a way that a shape of the edge of second section 236 mimics a shape of a vehicle 200 (e.g., a side profile of vehicle 200 looking from the back or front). As a non-limiting example, the length of second section 236 of plurality of washing component 120 may vary from 12 inches to 13 inches, or the like. As another non-limiting example, the length of second section 236 of plurality of washing component 120 may be shorter than 12 inches. As another non-limiting example, the length of second section 236 of plurality of washing component 120 may be longer than 13 inches. In a non-limiting example, plurality of fingers 232 may include different lengths that makes the fingers 232 resemble a shape of vehicle 200, encompassing a side of vehicle 200. In some embodiments, one washing component 120 may include sixteen fingers 232. In another embodiment, one washing component 120 may include less or more than sixteen fingers 232. In some embodiments, plurality of fingers 232 may include uniformed width. As a non-limiting example, if one washing component 120 has 7 inches of width and one washing component 120 has sixteen fingers 232, each fingers 232 may have 0.4375 or 7/16 inches of width. In some embodiments, plurality of fingers 232 may include various width. As a non-limiting example, if one washing component 120 has 7 inches of width and one washing component 120 has sixteen fingers 232, each fingers 232 may have width varying from 0.3 inches to 1 inch, or the like. The non-limiting examples of width of fingers 232 are merely examples, and persons skilled in the art upon reviewing the entirety of this disclosure may appreciate various width of fingers 232 that can be used for car wash tool 104. The second section 236 of washing component 120 and fingers 232 are illustrated in FIGS. 3-4.

Referring now to FIG. 3, a cross section of a portion of an exemplary car wash tool 104 is illustrated. In FIG. 3, shaft 112 and one column of a plurality of washing components 120a-j mechanically connected to shaft 112 in a plurality of layers are illustrated. Car wash tool 104 includes a shaft 112. In some embodiments, shaft 112 may include a top portion 300 and a bottom portion 304 as illustrated in FIG. 3. Shaft 112 is configured to rotate about a rotation axis 308. In some embodiments, the top portion 300 of shaft 112 may be mechanically connected to a first portion 312 of a plurality of washing components 120a-j. As a non-limiting example, first portion 312 of washing components 120a-j may include different lengths of first section 228 of washing components 120. Continuing the non-limiting example, first portion 312 of washing components 120a-j may include different lengths of second section 236 of washing components 120. In some embodiments, the bottom portion 304 of shaft 112 may be mechanically connected to a second portion 316 of washing components 120a-j. As a non-limiting example, second portion 316 of washing components 120a-j may include same length of first section 228 of washing components 120. Continuing the non-limiting example, second portion 316 of washing components 120a-j may include same length of second section 236 of washing components 120. The first portion 312 and second portion 316 of washing components 120a-j are illustrated in FIG. 3. In some embodiments, shaft 112 may include a length of 70 inches in this exemplary car wash tools 104. Top portion 300 of shaft 112 may include 42 inches and bottom portion 304 of shaft 112 may include 28 inches.

With continued reference to FIG. 3, shaft 112 may include channel 216. In some embodiments, channel 216 may be positioned within shaft 112. In some embodiments, channel 216 may be configured to contain or deliver at least a fluid. As a non-limiting example, fluid may include air, water, detergent, wax, protectant, coatings, or the like. In some embodiments, shaft 112 may include one channel 216. In some embodiments, shaft 112 may include a plurality of channels 216. As a non-limiting example, first channel may contain or deliver air while second channel may contain or deliver water. In some embodiments, channel 216 may include corrosion resistive, water resistive materials, or the like. In some embodiments, channel 216 may be external to shaft 112.

With continued reference to FIG. 3, in some embodiments, fluid contained or delivered through channel 216 may be let out of shaft 112 through a plurality of holes 220. In a non-limiting example, fluid may be delivered directly to vehicle 200 through holes 220. For example, and without limitation, fluid may be expelled through holes 220 using pump 224 to pressurize the fluid and force it through holes 220, air-powered system utilizing compressed air to push the fluid through holes 220, or the like. In another non-limiting example, fluid may be delivered to a plurality of washing component 120 through holes 220, allowing the plurality of washing components 120 to get soaked with the fluid. For example, and without limitation, washing component 120 may get soaked with fluid using a capillary action. In some embodiments, holes 220 may be characterized by symmetrical round shape, or any shapes thereof. In some embodiments, holes 220 can vary in size and are uniformly distributed along the shaft. In some embodiments, holes 220 may reduce the overall weight of shaft 112, facilitate the attachment of other components, or allow for the passage of elements like bolts or pins. For example, and without limitation, holes 220 may also be used in the alignment and securing of washing components 120. By inserting fastening elements like bolts or pins through these holes 220, different cleaning components can be securely fixed to shaft 112. Arrangement may allow for quick and easy modification or replacement of parts, enhancing the versatility of car wash tool 104.

With continued reference to FIG. 3, car wash tool 104 includes a plurality of washing components 120a-j. In a non-limiting example, car wash tool 104 may include ten washing components 120a-j. In some embodiments, washing components 120a-j may be placed on shaft 112 in layers from top portion 300 of shaft 112 to bottom portion 304 of shaft 112 as illustrated in FIG. 3. In some embodiments, shaft 112 may include a plurality of pieces of washing components 120a-j mechanically attached to shaft 112 surrounding the surface of shaft 112 through the circumference of shaft 112. As a non-limiting example, shaft 112 may include 28 pieces of each washing components 120a-f and 48 pieces of each washing components 120g-j mechanically attached to shaft 112, surrounding the surface of shaft 112 at the same level of each washing components a-j. In a non-limiting example, bottom portion 304 of shaft 112 may include larger dimension than top portion 300 of shaft 112. In some embodiments, each of ten washing components 120a-j may include 7 inches width. In some embodiments, washing components 120a-j may include a first portion 312 including washing components 120a-f and a second portion 316 including washing components 120g-j. In a non-limiting example, washing components 120g-j of second portion 316 may include same length of plurality of fingers 232. In another non-limiting example, washing components 120a-f of first portion 312 may include same length of plurality of fingers 232 each other, but the length of each of the plurality of fingers 232 may be different. For example, and without limitation, washing components 120a-f of first portion 312 may include a shape of tapered end because the length of plurality of fingers 232 reduces its length gradually from a top surface of each washing components 120a-f to a bottom surface of each washing components 120a-f. In some embodiments, plurality of fingers 232 of first portion 312 of plurality of washing components 120a-j may include longer length than plurality of fingers 232 of second portion 316 of plurality of washing components 120a-j. In a non-limiting example, a top surface of washing component 120a may include a length of 27 inches while a bottom surface of washing component 120j may include a length of 20 inches.

With continued reference to FIG. 3, in some embodiments, washing components 120a-j may include various materials. As a non-limiting example, plurality of washing components 120a-f may include two materials illustrated in FIG. 3 with dash lines. For example, and without limitation, plurality of washing components 120a-f may include cloth and foam. As another non-limiting example, plurality of washing components 120g-j may include one material as illustrated in FIG. 3 with flexible material lines. For example, and without limitation, plurality of washing components 120g-j may include cloth. In some embodiments, a plurality of pieces of plurality of washing components 120a-j may include various materials. As a non-limiting example, first piece of washing component 120a-f may include cloth and second piece of washing components 120a-f may include foam, repeating this pattern until 28th piece of washing component 120a. As another non-limiting example, all 48 pieces of washing components 120g-j may include cloth.

With continued reference to FIG. 3, in some embodiments, washing components 120a-j may include various colors. In some embodiments, each layer of washing components 120a-j may include same color and layers of washing components 120a-j may include different colors each other. As a non-limiting example, first layer of washing components 120a and second layer of washing components 120b may include black and third layer of washing components 120c and fourth layer of washing components 120d may include green. As a non-limiting example, first layer of washing components 120a may include black and second layer of washing components 120b may include green.

With continued reference to FIG. 3, the purpose of different dimensions of washing components 120a-j may be to mimic a shape of a vehicle 200. Dimensions and features described with respect to and illustrated in FIG. 3 are non-limiting examples, and persons skilled in the art, upon reviewing the entirety of this disclosure, may appreciate various dimensions and features that can be used in car wash tool 104.

Referring now to FIG. 4, configurations of exemplary washing components 120 are illustrated. In FIG. 4, washing component 120c, washing component 120e and washing component 120f are illustrated as non-limiting examples. The rules of dimensions for washing component 120c and washing component 120e may apply to washing component 120a, washing component 120b and washing component 120d. The rules of dimensions for washing component 120f may apply to washing component 120a, washing component 120b and washing component 120d. In some embodiments, plurality of fingers 232 of plurality of washing components 120a-f may include longer length than plurality of fingers 232 of plurality of washing components 120g-j. As a non-limiting example, plurality of fingers 232 of plurality of washing components 120a-f may include a tapered end. In a non-limiting example, plurality of washing components 120a-f may include fingers that gradually reduce its length from a top surface 400 to a bottom surface 404 of each washing components 120a-f. In some embodiments, plurality of washing components 120g-j may include a first length (e.g., 20 inches as illustrated in FIG. 4) at a bottom surface 404 and a top surface 400 of plurality of washing components 120g-j, which is represented using washing component 120h in FIG. 4. In some embodiments, washing component 120c of plurality of washing components 120a-f may include a second length (e.g., 22½ inches as illustrated in FIG. 4) at a bottom surface 404 and a third length (e.g., 23¼ inches as illustrated in FIG. 4) at a top surface 400 of washing component 120c; the second length is longer than the first length and the third length is longer than the second length. In some embodiments, a washing component 120f of plurality of washing components 120a-j may include the third length at a bottom surface 404 and a fourth length (e.g., 24 inches as illustrated in FIG. 4) at a top surface 400 of washing component 120f; the fourth length is longer than the third length. This explains that, as a non-limiting example, when first washing component 120 (e.g., any washing component 120 of washing components 120a-f) is placed above second washing component 120 (e.g., any washing component 120 of washing components 120a-f), the first washing component 120 may include a length of bottom surface 404 that is equivalent to a length of a top surface 400 of the second washing component 120.

With continued reference to FIG. 4, in some embodiments, plurality of fingers 232 of washing components 120g-j may include same lengths (e.g., 12 inches as illustrated in FIG. 4). In some embodiments, plurality of fingers 232 of each washing components 120a-f may include different lengths (e.g., 12 inches to 12¾ inches from bottom surface 404 to top surface 400 as illustrated in FIG. 4) while lengths of first sections 228 of washing components 120a-f are different. As a non-limiting example, washing component 120f may include longer length compared to washing component 120c, which is placed below washing component 120f. This means, as a non-limiting example, the length of first section 228 of washing components 120a-f may be longer than the length of second section 236 of washing components 120g-j. This also means, as a non-limiting example, the length of first section 228 may include as washing components 120a-f is at upper layer.

With continued reference to FIG. 4, dimensions and features described with respect to and illustrated in FIG. 4 are non-limiting examples, and persons skilled in the art, upon reviewing the entirety of this disclosure, may appreciate various dimensions and features that can be used in car wash tool 104.

Figure 5:
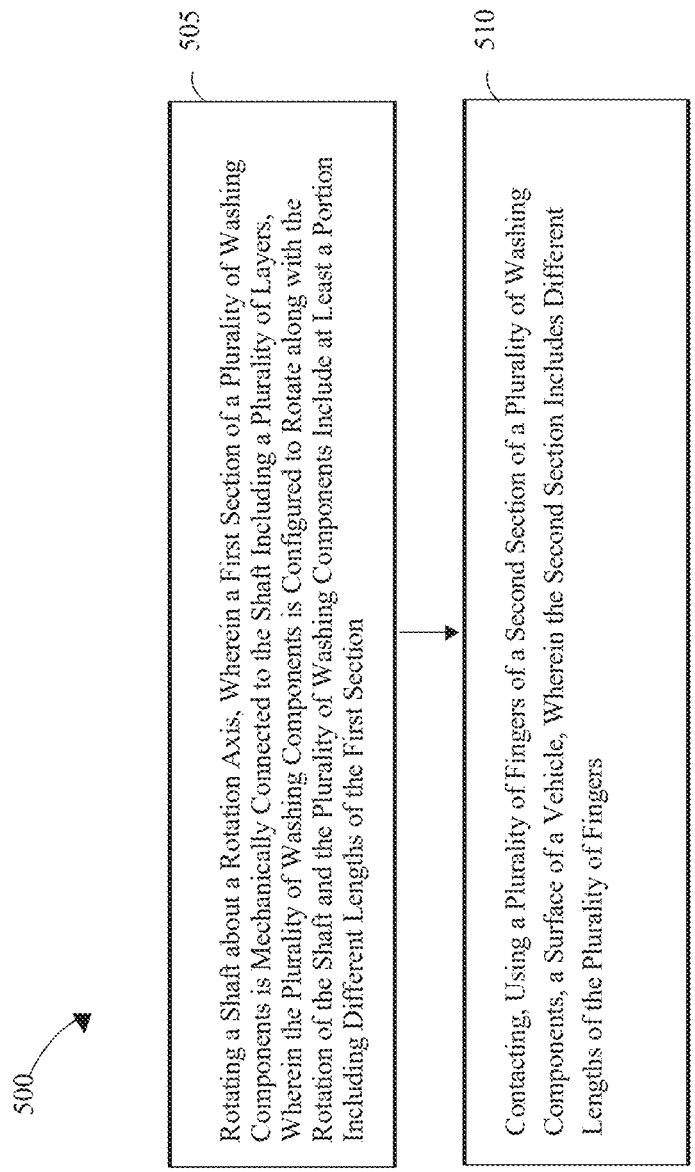
FIG. 5 illustrates a flow diagram of an exemplary method of use of a car wash tool.

Referring now to FIG. 5, a flow diagram of an exemplary method 500 of use of a car wash tool is illustrated. Method 500 includes a step 505 of rotating a shaft about a rotation axis, wherein a first section of a plurality of washing components is mechanically connected to the shaft including a plurality of layers, wherein the plurality of washing components is configured to rotate along with the rotation of the shaft and the plurality of washing components include at least a portion including different lengths of the first section. In some embodiments, the shaft may include a top portion, wherein the top portion is mechanically connected to a first portion of the plurality of washing components including the different lengths of the first section of the plurality of washing components and a bottom portion, wherein the bottom portion is mechanically connected to a second portion of the plurality of washing components including same length of the first section of the plurality of washing components. In some embodiments, the top portion of the shaft may be longer than the bottom portion of the shaft. In some embodiments, the shaft comprises at least a channel, wherein the at least a channel may be configured to deliver a fluid through holes of the shaft. In some embodiments, method 500 may further include extending the top portion of the shaft from the bottom portion of the shaft using an actuator. In some embodiments, the second portion of the plurality of washing components may include a first length at a bottom surface of the second portion and the first length at a top surface of the second portion and a first washing component of the first portion of the plurality of washing components may include a second length at a bottom surface and a third length at a top surface of the first washing component, wherein the second length is longer than the first length and the third length is longer than the second length. In some embodiments, a second washing component of the first portion of the plurality of washing components may include the third length at a bottom surface and a fourth length at a top surface of the second washing component, wherein the fourth length is longer than the third length. In some embodiments, the first portion of the plurality of washing components may include at least two materials and the second portion of the plurality of washing components may include one material. In some embodiments, the plurality of fingers of the first portion of the plurality of washing components may include longer length than the plurality of fingers of the second portion of the plurality of washing components. In some embodiments, the plurality of fingers of the first portion of the plurality of washing components may include a tapered end. These may be implemented as reference to FIGS. 1-4.

With continued reference to FIG. 5, method 500 includes a step 510 of contacting, using a plurality of fingers of a second section of a plurality of washing components, a surface of a vehicle, wherein the second section includes different lengths of the plurality of fingers, wherein the plurality of washing components includes a shape that mimics a shape of a vehicle. These may be implemented as reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
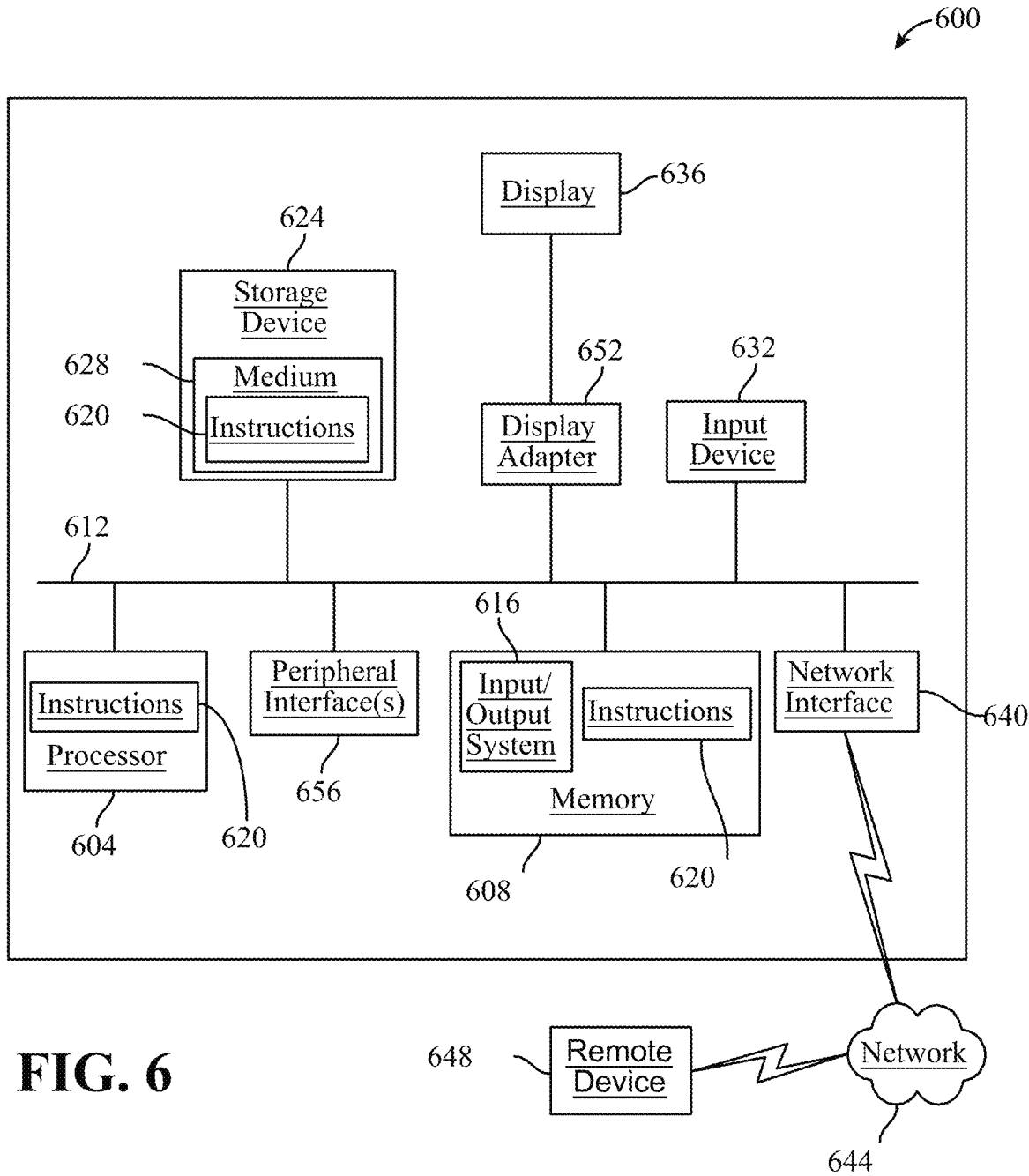
FIG. 6 illustrates a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and memory 608 that communicate with each other, and with other components, via a bus 612. Bus 612 may include any of several types of bus structures including, but not limited to, memory bus, memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve tools and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A car wash tool, the car wash tool comprising:
a shaft, wherein the shaft is configured to rotate about a rotation axis; and
a plurality of washing components configured to rotate along with the rotation of the shaft, wherein each of the plurality of washing components comprises:
  a first section, mechanically connected to the shaft, comprising a plurality of layers, wherein the plurality of washing components comprise at least a portion comprising different lengths of the first section; and
  a second section, wherein the second section comprises a plurality of fingers configured to make contact with a surface of a vehicle;
wherein the shaft comprises:
  a top portion, wherein the top portion is mechanically connected to a first portion of the plurality of washing components comprising the different lengths of the first section of the plurality of washing components; and
  a bottom portion, wherein the bottom portion is mechanically connected to a second portion of the plurality of washing components comprising a same length of the first section of the plurality of washing component wherein:
    the second portion of the plurality of washing components comprises a first length at a bottom surface of the second portion and the first length at a top surface of the second portion; and
    a first washing component of the first portion of the plurality of washing components comprises a second length at a bottom surface and a third length at a top surface of the first washing component, wherein the second length is longer than the first length and the third length is longer than the second length.

2. The car wash tool of claim 1, wherein the top portion of the shaft is longer than the bottom portion of the shaft.

3. The car wash tool of claim 1, wherein the shaft comprises at least a channel, wherein the at least a channel is configured to deliver a fluid through holes of the shaft.

4. The car wash tool of claim 1, wherein the top portion of the shaft is configured to be extended from the bottom portion of the shaft using an actuator.

5. The car wash tool of claim 1, wherein the plurality of fingers of the first portion of the plurality of washing components comprises longer length than a plurality of fingers of the second portion of the plurality of washing components.

6. The car wash tool of claim 1, wherein a plurality of fingers of the first portion of the plurality of washing components comprises a tapered end.

7. The car wash tool of claim 1, wherein a second washing component, distinct from the first washing component, of the first portion of the plurality of washing components comprises the third length at a bottom surface and a fourth length at a top surface of the second washing component, wherein the fourth length is longer than the third length.

8. The car wash tool of claim 1, wherein:
the first portion of the plurality of washing components comprises at least two materials; and
the second portion of the plurality of washing components comprises one material.

9. A method of use of a car wash tool, the method comprising:
rotating a shaft about a rotation axis, wherein a first section of a plurality of washing components is mechanically connected to the shaft comprising a plurality of layers, wherein the plurality of washing components is configured to rotate along with the rotation of the shaft and the plurality of washing components comprise at least a portion comprising different lengths of the first section; and
contacting, using a plurality of fingers of a second section of the plurality of washing components, a surface of a vehicle, wherein the second section comprises different lengths of the plurality of fingers;
wherein the shaft comprises:
  a top portion, wherein the top portion is mechanically connected to a first portion of the plurality of washing components comprising the different lengths of the first section of the plurality of washing components; and a bottom portion, wherein the bottom portion is mechanically connected to a second portion of the plurality of washing components comprising a same length of the first section of the plurality of washing component wherein:

the second portion of the plurality of washing components comprises a first length at a bottom surface of the second portion and the first length at a top surface of the second portion; and a first washing component of the first portion of the plurality of washing components comprises a second length at a bottom surface and a third length at a top surface of the first washing component, wherein the second length is longer than the first length and the third length is longer than the second length.

10. The method of claim 9, wherein the top portion of the shaft is longer than the bottom portion of the shaft.

11. The method of claim 9, wherein the shaft comprises at least a channel, wherein the at least a channel is configured to deliver a fluid through holes of the shaft.

12. The method of claim 9, further comprising:
extending the top portion of the shaft from the bottom portion of the shaft using an actuator.

13. The method of claim 9, wherein the plurality of fingers of the first portion of the plurality of washing components comprises longer length than the plurality of fingers of the second portion of the plurality of washing components.

14. The method of claim 9, wherein the plurality of fingers of the first portion of the plurality of washing components comprises a tapered end.

15. The method of claim 9, wherein a second washing component, distinct from the first washing component, of the first portion of the plurality of washing components comprises the third length at a bottom surface and a fourth length at a top surface of the second washing component, wherein the fourth length is longer than the third length.

16. The method of claim 9, wherein:
the first portion of the plurality of washing components comprises at least two materials; and
the second portion of the plurality of washing components comprises one material.

* * * * *